US012718760B2

(12) United States Patent
Lee et al.

(10) Patent No.: US 12,718,760 B2
(45) Date of Patent: Aug. 25, 2026

(54) DISPLAY DEVICE INCLUDING A CONTROLLER AND ELECTRONIC DEVICE INCLUDING THE SAME

(71) Applicant: SAMSUNG DISPLAY CO., LTD., Yongin-si (KR)

(72) Inventors: Hyun Dae Lee, Yongin-si (KR); Sang Min Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/230,682

(22) Filed: Jun. 6, 2025

(65) Prior Publication Data

US 2026/0094567 A1 Apr. 2, 2026

(30) Foreign Application Priority Data

Sep. 30, 2024 (KR) ........................ 10-2024-0132964

(51) Int. Cl.
*G09G 3/3233* (2016.01)

(52) U.S. Cl.
CPC ... *G09G 3/3233* (2013.01); *G09G 2300/0439* (2013.01); *G09G 2320/0233* (2013.01); *G09G 2330/021* (2013.01); *G09G 2330/028* (2013.01)

(58) Field of Classification Search
CPC ......... G09G 2320/0673; G09G 3/2044; G09G 3/2051; G09G 3/2092
See application file for complete search history.

(56) References Cited

U.S. PATENT DOCUMENTS 5,504,504 A * 4/1996 Markandey ........ G02B 26/0841 345/55
9,916,790 B2 3/2018 Kim
2014/0285535 A1 9/2014 Pyo
2021/0264843 A1* 8/2021 Pyun .................... G09G 3/2092

FOREIGN PATENT DOCUMENTS

JP 2011-075929 A2 4/2011
KR 10-2014-0116659 A 10/2014
KR 10-2194578 B1 12/2020
KR 10-2552964 B1 7/2023

* cited by examiner

*Primary Examiner* — Kevin M Nguyen
(74) *Attorney, Agent, or Firm* — F. CHAU & ASSOCIATES, LLC

(57) ABSTRACT

A display device includes a display panel including a plurality of sub-pixels and divided into a plurality of zones; a voltage generator applying a first power source voltage having a voltage level corresponding to each of the plurality of zones through a plurality of power source channels; and a controller outputting, to the voltage generator, a code value that determines the voltage level of the first power source voltage applied by the voltage generator, and the controller includes an update unit that updates a code value of a target zone based on a difference between an adjacent code value and the code value of the target zone, and the adjacent code value is a code value of a zone adjacent to the target zone.

20 Claims, 10 Drawing Sheets

VDD: VDD1, VDD2, VDD3, VDD4

DISPLAY DEVICE INCLUDING A CONTROLLER AND ELECTRONIC DEVICE INCLUDING THE SAME

CROSS-REFERENCE TO RELATED APPLICATION

The application claims priority to and the benefit of Korean Patent Application No. 10-2024-0132964, filed on Sep. 30, 2024, in the Korean Intellectual Property Office, which is hereby incorporated by reference for all purposes as if fully set forth herein.

BACKGROUND

1. Technical Field

The present disclosure relates to a display device including a controller and an electronic device including the same.

2. Discussion of Related Art

As information technology develops, the importance of display devices, which are a connection medium between users and information, is emerging. In response, the use of display devices, such as a liquid crystal display device or an organic light emitting display device, is increasing.

A display device may display an image using a plurality of sub-pixels. The sub-pixels may generate light of a predetermined luminance by controlling the amount of current flowing from a power source to a zone of the display device in response to a data signal. When power source voltages are applied to a plurality of zones of the display device, boundaries between adjacent zones may be visually recognized.

SUMMARY

According to an aspect of the present invention, a display device may control voltage levels applied to zones so that visually perceptible differences between adjacent zones caused by a difference in voltage levels between the adjacent zones may be reduced or eliminated, and an electronic device including the same.

A display device according to embodiments of the present invention may include a display panel including a plurality of sub-pixels and divided into a plurality of zones; a voltage generator applying a first power source voltage having a voltage level corresponding to each of the plurality of zones through a plurality of power source channels; and a controller outputting, to the voltage generator, a code value that determines the voltage level of the first power source voltage applied by the voltage generator. The controller may include an update unit that updates a code value of a target zone based on a difference between an adjacent code value and the code value of the target zone, and the adjacent code value may be a code value of a zone adjacent to the target zone.

In some embodiments, a difference between an updated code value of the target zone and the adjacent code value may be less than a reference value.

In some embodiments, each of the plurality of sub-pixels may include a light emitting element connected between a first power source voltage node to which the first power source voltage is applied and a second power source voltage node to which a second power source voltage is applied, and the light emitting element may emit light in response to current flowing to the first power source voltage node and the second power source voltage node.

In some embodiments, the display device may further include a gate driver applying a gate signal to the sub-pixels through gate lines, and the controller may further include a calculator calculating the code values of the plurality of zones. The calculator may calculate a code value corresponding to a first zone when the gate signal is applied to all sub-pixels included in the first zone among the plurality of zones.

In some embodiments, the display device may further include a plurality of adjacent zones, including the zone adjacent to the target zone, wherein each adjacent zone of the plurality of adjacent zones may have at least one side proximate to the target zone, and wherein the difference between the adjacent code value and the code value of the target zone is greater than a different between each remaining adjacent zone of the plurality of adjacent zones and the code value of the target zone.

In some embodiments, the update unit may calculate a difference between the code value of the target zone and the adjacent code values when the code value of the target zone is less than at least one of the adjacent code values, compare a maximum difference value, which is a largest value among the difference values calculated by the controller, with a reference value, and update the code value of the target zone so that the maximum difference value is less than the reference value when the maximum difference value is greater than or equal to the reference value.

In some embodiments, the code value of the target zone updated by the controller may be greater than the code value of the target zone before being updated.

In some embodiments, the display device may further include a memory storing a code value corresponding to each of the plurality of zones. The controller may calculate the code value corresponding to each of the plurality of zones during a first frame, and output calculated code values to the memory. The update unit may update the code value of the target zone based on code values stored in the memory.

In some embodiments, the update unit may output the code value updated for the target zone to the voltage generator before a second frame, which is a next frame following the first frame, starts.

In some embodiments, the update unit may sequentially output updated code values during a second frame, which is the next frame following a first frame.

In some embodiments, the display device may further include a gate driver applying a gate signal to the sub-pixels through a plurality of gate lines, and the update unit may output the code value updated for the target zone to a first zone before the gate signal is applied to the sub-pixels included in the first zone among the plurality of zones during the second frame.

In some embodiments, the voltage generator may include a first multiplexer connected to a first zone among the plurality of zones through a first power source channel; a first voltage generating circuit outputting a first power source voltage having a first voltage level to the first multiplexer; a second voltage generating circuit outputting a first power source voltage having a second voltage level to the first multiplexer; a third voltage generating circuit outputting a first power source voltage having a third voltage level to the first multiplexer; and a fourth voltage generating circuit outputting a first power source voltage having a fourth voltage level to the first multiplexer. The first multiplexer may output the first power source voltage having one of the first to fourth voltage levels to the first zone based on a code value received from the update unit.

An electronic device according to embodiments of the present invention may include a processor generating input image data and a control signal; and a display device displaying an image based on the input image data and the control signal. The display device may include a display panel including a plurality of sub-pixels and divided into a plurality of zones; a voltage generator applying a first power source voltage having a voltage level corresponding to each of the plurality of zones through a plurality of power source channels; and a controller controlling the display panel and the voltage generator based on the input image data and the control signal, and outputting, to the voltage generator, a code value that determines the voltage level of the first power source voltage applied by the voltage generator. The controller may include an update unit that updates a code value of a target zone based on a difference between an adjacent code value and the code value of the target zone, and the adjacent code value may be a code value of a zone proximate to the target zone.

In some embodiments, a difference between an updated code value of the target zone and the adjacent code value may be less than a reference value.

In some embodiments, each of the plurality of sub-pixels may include a light emitting element connected between a first power source voltage node to which the first power source voltage is applied and a second power source voltage node to which a second power source voltage is applied, and the light emitting element may emit light in response to current flowing to the first power source voltage node and the second power source voltage node.

In some embodiments, the update unit may calculate a difference between the code value of the target zone and the adjacent code values when the code value of the target zone is less than at least one of the adjacent code values, compares a maximum difference value, which is a largest value among the difference values calculated by the controller, with the reference value, and updates the code value of the target zone so that the maximum difference value is less than the reference value when the maximum difference value is greater than or equal to the reference value.

A display device according to embodiments of the present disclosure may include a display panel including a plurality of sub-pixels and divided into a plurality of zones including a target zone and a plurality of adjacent zones; a voltage generator applying a first power source voltage having a voltage level corresponding to each of the plurality of zones through a plurality of power source channels; and a controller includes a calculator calculating a plurality of code values of the plurality of zones, a memory storing the plurality of code values, and an update unit that updates a code value of a first target zone based on a difference between a first adjacent code value and the code value of the first target zone and a reference value, wherein the first adjacent code value is a code value of a zone proximate to the first target zone among the plurality of zones, wherein the controller outputs, to the voltage generator, the plurality of code values, including the code value updated for the first target zone, that determine the voltage level of the first power source voltage applied by the voltage generator, and wherein the code value updated for the first target zone reduces a difference in luminance between pixels of the first target zone and pixels of a first adjacent zone corresponding to the first adjacent code value.

In some embodiments, the update unit may calculate a difference between a code value of a second target zone and a second adjacent code value of the second target zone when the code value of the second target zone is less than at least one of the adjacent code values; compare the difference between the code value of the second target zone and the second adjacent code value of the second target zone with the reference value; and maintain the code value of the second target zone when the difference between the code value of the second target zone and the second adjacent code value of the second target zone is less than the reference value.

In some embodiments, the display device may further include a gate driver applying a gate signal to the sub-pixels through a plurality of gate lines, wherein the update unit outputs the code value updated for the target zone to a first zone before the gate signal is applied to the sub-pixels included in the first zone among the plurality of zones during a next frame.

In some embodiments, the voltage generator may include a first multiplexer connected to a first zone among the plurality of zones through a first power source channel; a first voltage generating circuit outputting a first power source voltage having a first voltage level to the first multiplexer; a second voltage generating circuit outputting a first power source voltage having a second voltage level to the first multiplexer; a third voltage generating circuit outputting a first power source voltage having a third voltage level to the first multiplexer; and a fourth voltage generating circuit outputting a first power source voltage having a fourth voltage level to the first multiplexer. The first multiplexer may output the first power source voltage having one of the first to fourth voltage levels to the first zone based on a code value received from the update unit.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION

Figure 1:
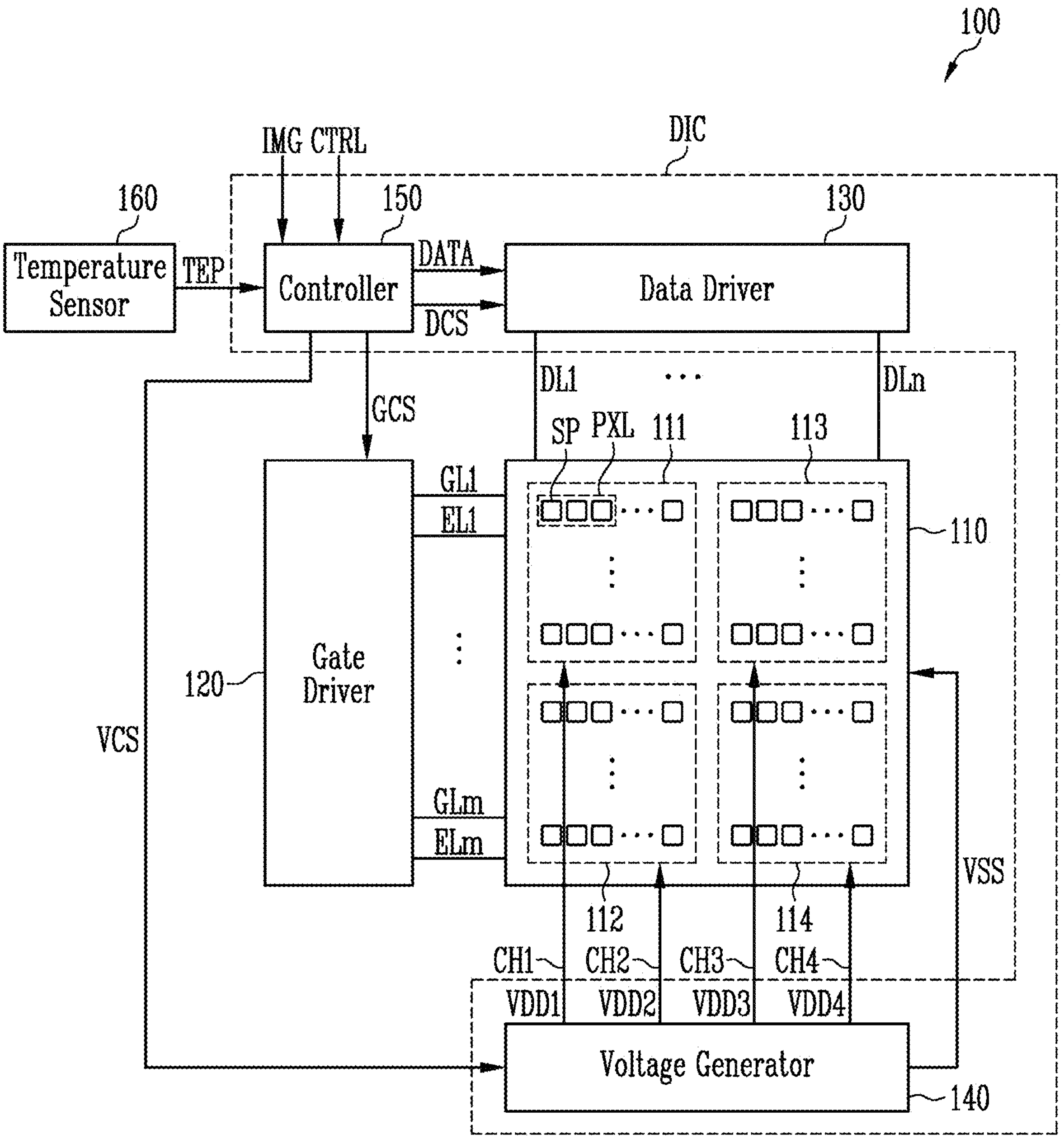
FIG. 1 is a block diagram illustrating an embodiment of a display device.

Hereinafter, preferred embodiments of the present invention will be described in more detail with reference to the accompanying drawings. It should be noted that in the following description, parts or steps useful to understanding the operation according to the present invention are described, and descriptions of other parts may be omitted in order to not obscure the gist of the present invention. In addition, the present invention is not limited to embodiments described herein and may be embodied in other forms. Embodiments described herein are provided merely to explain in sufficient detail to enable those skilled in the art to implement the technical idea of the present invention.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the present invention. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited by these terms. These terms may be used to distinguish one component from another component. Therefore, a first component may refer to a second component within a range without departing from the scope disclosed herein.

Spatially relative terms such as "under", "on", and the like may be used for descriptive purposes, thereby describing the relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features may be positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating example embodiments, which may be idealized. Accordingly, it will be expected that shapes may vary, for example, according to tolerances and/or manufacturing techniques. Therefore, embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and embodiments are not limited thereto.

In display devices having pixel blocks, boundaries between pixel blocks may be precipitable to a user when differences in luminance between the pixel blocks increase. According to embodiments of the present disclosure, differences in luminance between zones of a display panel may be decreased and image quality may be increased. According to embodiments of the present disclosure, a controller of a display device may control voltage levels supplied to adjacent zones that reduces the differences in luminance between the zones. The controller may use code values supplied to a voltage generator to control the voltages levels.

FIG. 1 is a block diagram illustrating an embodiment of a display device.

Referring to FIG. 1, a display device 100 may include a display panel 110, a gate driver 120, a data driver 130, a voltage generator 140, and a controller 150.

The display panel 110 may include sub-pixels SP. The sub-pixels SP may be connected to the gate driver 120 through first to m-th gate lines GL1 to GLm. The sub-pixels SP may be connected to the data driver 130 through first to n-th data lines DL1 to DLn. Here, n and m are positive integers, and may be the same or different numbers.

Each of the sub-pixels SP may include at least one light emitting element configured to generate light. Accordingly, each of the sub-pixels SP may generate light of a specific color, such as red, green, blue, cyan, magenta, or yellow. Two or more sub-pixels among the sub-pixels SP may form a pixel PXL. For example, as shown in FIG. 1, three sub-pixels may form a pixel PXL.

The display panel 110 may be divided into a plurality of zones, each zone including a plurality of sub-pixels SP. The division of the display panel 110 include a plurality of zones may be a physical division identifiable by, for example, a wiring of the display panel. Referring to FIG. 1, the display panel 110 may include a first zone 111, a second zone 112, a third zone 113, and a fourth zone 114. A first power source channel CH1 may be connected to the first zone, a second power source channel CH2 may be connected to the second zone 112, a third power source channel CH3 may be connected to the third zone 113, and a fourth power source channel CH4 may be connected to the fourth zone 114. A first power source voltage VDD may be applied to the first to fourth zones 111 to 114 through the power source channels CH1 to CH4, respectively. For example, the division of the display panel 110 into a plurality of zones may be a physical division identifiable by, for example, the power source channel applied to the sub-pixels of the display panel 110. For example, the sub-pixels included in the first zone 111 may be defined by the use a voltage supplied by the first power source channel CH1.

A second power source voltage VSS may be applied to the display panel 110 through a power source line. The power source line may be separated from the power source channels CH1 to CH4. In at least one embodiment, the second power source voltage VSS may be applied to the display panel 110 through a power source line paired with the power source channels CH1 to CH4.

In some embodiments, a first zone power source voltage VDD1 may be applied to the first zone 111, a second zone power source voltage VDD2 may be applied to the second zone 112, a third zone power source voltage VDD3 may be applied to the third zones 113, and a fourth zone power source voltage VDD4 may be applied to the fourth zone 114. The number of zones (e.g., the first to fourth zones 111 to 114) may be equal to the number of power source channels CH1 to CH4. The first to fourth zone power source voltages VDD1 to VDD4 may be referred to as the first power source voltage VDD. In some embodiments, power source levels of the first to fourth zone power source voltages VDD1 to VDD4 may be determined individually. Accordingly, the power source levels of the first to fourth zone power source voltages VDD1 to VDD4 may be different or the same.

In addition, for uniform power source control, the first to fourth zones 111 to 114 may include the same number of sub-pixels.

In FIG. 1, the display panel 110 is shown as including four zones, but the present invention is not limited thereto, and the shape, number, and size of the zones (e.g., the first to fourth zones 111 to 114) may be variously changed.

The gate driver 120 may be connected to the sub-pixels SP through the first to m-th gate lines GL1 to GLm. For example, the gate driver 120 may be connected to the sub-pixels SP arranged in a row direction through the first to m-th gate lines GL1 to GLm. The gate driver 120 may output gate signals to the first to m-th gate lines GL1 to GLm in response to a gate control signal GCS. The gate control signal GCS may be output by the controller 150. In some embodiments, the gate control signal GCS may include a start signal indicating the start of each frame and a horizontal synchronization signal for outputting gate signals in synchronization with the timing at which data signals are applied. The gate control signal GCS may include one or more additional signals.

In some embodiments, first to m-th emission control lines EL1 to ELm connected to the sub-pixels SP may be further provided. The first to m-th emission control lines EL1 to ELm may be connected to the sub-pixels SP arranged in the row direction may be further provided. In this case, the gate driver 120 may include an emission control driver configured to control the first to m-th emission control lines EL1 to ELm, and the emission control driver may operate under the control of the controller 150.

The gate driver 120 may be disposed proximate to the display panel 110. For example, the gate driver 120 may be disposed adjacent to a side of the display panel 110. However, embodiments are not limited thereto. For example, the gate driver 120 may be divided into two or more drivers that are physically and/or logically separated from each other and from the display panel 110. Such drivers may be disposed on a first side of the display panel 110 and a second side of the display panel 110 opposite to the first side. In this way, the gate driver 120 may be disposed on a periphery of the display panel 110 in various forms according to embodiments.

The data driver 130 may be connected to the sub-pixels SP through the first to n-th data lines DL1 to DLn. For example, the data driver 130 may be connected to the sub-pixels SP arranged in a column direction through the first to n-th data lines DL1 to DLn. The data driver 130 may receive image data DATA and a data control signal DCS from the controller 150. The data driver 130 may operate in response to the data control signal DCS. In some embodiments, the data control signal DCS may include a source start pulse, a source shift clock, or a source output enable signal. The data control signal DCS may include one or more additional signals.

The data driver 130 may apply data signals having grayscale voltages corresponding to the image data DATA to the first to n-th data lines DL1 to DLn. The data driver 130 may apply data signals having grayscale voltages corresponding to the image data DATA to the first to n-th data lines DL1 to DLn using voltages from the voltage generator 140. When a gate signal is applied to each of the first to m-th gate lines GL1 to GLm, data signals corresponding to the image data DATA may be applied to the data lines DL1 to DLm. Corresponding sub-pixels SP may generate light corresponding to the data signals. An image may be displayed on the display panel 110 corresponding to the light generated by the sub-pixels SP.

In some embodiments, the gate driver 120 and data driver 130 may include complementary metal-oxide semiconductor (CMOS) circuit elements.

The voltage generator 140 may operate in response to a voltage control signal VCS received from the controller 150. The voltage generator 140 may be configured to generate a plurality of voltages and provide the generated voltages to components of the display device 100. For example, the voltage generator 140 may be configured to generate the plurality of voltages by receiving an input voltage from outside the display device 100, adjusting the received voltage, and regulating the adjusted voltage.

The voltage generator 140 may generate the first power source voltage VDD and the second power source voltage VSS. The generated first and second power source voltages VDD and VSS may be provided to the sub-pixels SP. The first power source voltage VDD may have a relatively high voltage level, and the second power source voltage VSS may have a lower voltage level than the first power source voltage VDD. In at least one embodiment, the first power source voltage VDD or the second power source voltage VSS may be provided by a device external to the display device 100.

In addition, the voltage generator 140 may generate various voltages. For example, the voltage generator 140 may generate an initialization voltage, which may be applied to the sub-pixels SP. For example, during a sensing operation for sensing electrical characteristics of transistors and/or light emitting elements of the sub-pixels SP, a predetermined reference voltage may be applied to the first to n-th data lines DL1 to DLn, and the voltage generator 140 may generate the reference voltage.

In some embodiments, the voltage generator 140 may apply the first to fourth zone power source voltages VDD1 to VDD4 to each zone in response to the voltage control signal VCS. The voltage generator 140 may apply the first power source voltage VDD to the first to fourth zones 111 to 114 through a plurality of power source channels CH1 to CH4 corresponding to the first to fourth zone power source voltages VDD1 to VDD4 for each zone.

The controller 150 may control one or more operations of the display device 100. The controller 150 may receive input image data IMG and a control signal CTRL for controlling the display panel 110. The input image data IMG and the control signal CTRL may be received from output the display device 100. In response to the control signal CTRL, the controller 150 may generate the gate control signal GCS, the data control signal DCS, and the voltage control signal VCS.

The controller 150 may convert the input image data IMG to be suitable for the display device 100 or the display panel 110 and output the image data DATA. In some embodiments, the controller 150 may convert the input image data IMG to be suitable for the sub-pixels SP in a row unit and output the image data DATA.

The controller 150 may adjust a voltage level of the first power source voltage VDD between adjacent zones of the display panel 110 so that a difference in voltage level of the first power source voltage VDD between adjacent zones may be reduced. Accordingly, a difference in luminance between adjacent zones due to different voltage levels of the first power source voltage VDD applied to each zone may be reduced. The zones may be arranged in rows and columns. Adjacency may be variously determined. The adjacent zone may have at least one side in contact with a target zone. The adjacent zone may be adjacent to the target zone in one of the directions of up, down, left, and right. For example, a 4-neighbor adjacency or an 8-neighbor adjacency may be used. In the case of 4-neighbor adjacency, two vertical and two horizontal neighbors proximate to the target zone may be considered adjacent. In the case of 8-neighbor adjacency, surrounding zones proximate to the target zone may be considered adjacent. A more detailed description of this will be described later with reference to FIG. 4 and FIG. 5.

In some embodiments, two or more components of the data driver 130, the voltage generator 140, and the controller 150 may be mounted on a single integrated circuit. As shown in FIG. 1, the data driver 130, the voltage generator 140, and the controller 150 may be included in a driver integrated circuit DIC. In such a case, the data driver 130, the voltage generator 140, and the controller 150 may be functionally separate components within the driver integrated circuit DIC. In at least one embodiment, at least one of the data driver 130, the voltage generator 140, and the controller 150 may be provided as a separate component from the driver integrated circuit DIC. In an embodiment, the driver integrated circuit DIC may be omitted and the data driver 130, the voltage generator 140, and the controller 150 may be provided as separate components.

The display device 100 may include at least one temperature sensor 160. The temperature sensor 160 may be configured to sense the temperature of its surroundings and generate temperature data TEP representing the sensed temperature. In some embodiments, the temperature sensor 160 may be disposed adjacent to the display panel 110 and/or the driver integrated circuit DIC.

The controller 150 may control various operations of the display device 100 in response to the temperature data TEP. In some embodiments, the controller 150 may adjust the luminance of an image output from the display panel 110 in response to the temperature data TEP. For example, the controller 150 may adjust the data signals and the first and second power source voltages VDD and VSS by controlling components such as the data driver 130 and/or the voltage generator 140.

Figure 2:
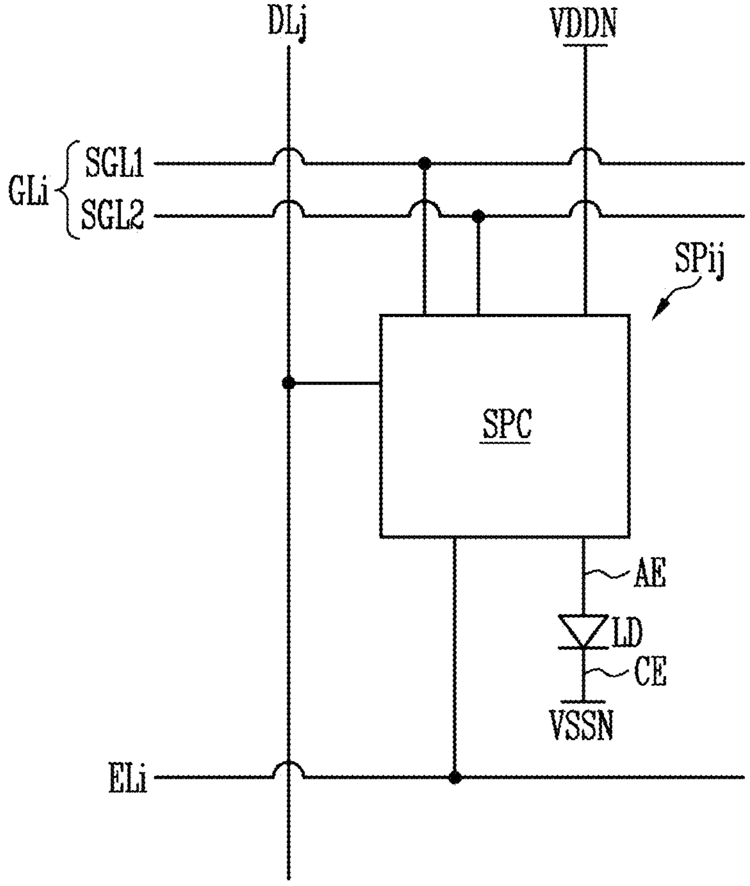
FIG. 2 is a block diagram illustrating an embodiment of one of sub-pixels of FIG. 1.

FIG. 2 is a block diagram illustrating an embodiment of a sub-pixel of FIG. 1. FIG. 2 shows, as an example, a sub-pixel SPij arranged in an i-th row (i may be an integer greater than or equal to 1 and less than or equal to m) and a j-th column (j may be an integer greater than or equal to 1 and less than or equal to n) among the sub-pixels SP of FIG. 1.

Referring to FIG. 2, the sub-pixel SPij may include a sub-pixel circuit SPC and a light emitting element LD.

The light emitting element LD may be connected between a first power source voltage node VDDN and a second power source voltage node VSSN. In this case, the first power source voltage node VDDN may be a node that applies the first power source voltage VDD of FIG. 1, and the second power source voltage node VSSN may be a node that applies the second power source voltage VSS of FIG. 1.

An anode electrode AE of the light emitting element LD may be connected to the first power source voltage node VDDN through the sub-pixel circuit SPC. A cathode electrode CE of the light emitting element LD may be connected to the second power source voltage node VSSN. For example, the anode electrode AE of the light emitting element LD may be connected to the first power source voltage node VDDN through one or more transistors included in the sub-pixel circuit SPC.

The sub-pixel circuit SPC may be connected to an i-th gate line GLi among the first to m-th gate lines GL1 to GLm of FIG. 1, an i-th emission control line ELi among the first to m-th emission control lines EL1 to ELm of FIG. 1, and a j-th data line DLj among the first to n-th data lines DL1 to DLn of FIG. 1. The sub-pixel circuit SPC may be configured to control the light emitting element LD according to signals received through these signal lines.

The sub-pixel circuit SPC may operate in response to a gate signal received through the i-th gate line GLi. The i-th gate line GLi may include one or more sub-gate lines. In some embodiments, as shown in FIG. 2, the i-th gate line GLi may include a first sub-gate line SGL1 and a second sub-gate line SGL2. The sub-pixel circuit SPC may operate in response to gate signals received through the first and second sub-gate lines SGL1 and SGL2. In this way, when the i-th gate line GLi includes two or more sub-gate lines, the sub-pixel circuit SPC may operate in response to gate signals received through corresponding sub-gate lines.

The sub-pixel circuit SPC may operate in response to an emission control signal received through the i-th emission control line ELi. In some embodiments, the i-th emission control line ELi may include one or more sub-emission control lines. When the i-th emission control line ELi includes two or more sub-emission control lines, the sub-pixel circuit SPC may operate in response to emission control signals received through corresponding sub-emission control lines.

The sub-pixel circuit SPC may receive a data signal through the j-th data line DLj. The sub-pixel circuit SPC may store a voltage corresponding to the data signal in response to at least one of the gate signals received through the first and second sub-gate lines SGL1 and SGL2. In response to the emission control signal received through the i-th emission control line ELi, the sub-pixel circuit SPC may control current flowing from the first power source voltage node VDDN to the second power source voltage node VSSN through the light emitting element LD according to the stored voltage. Accordingly, the light emitting element LD may generate light with a luminance corresponding to the data signal.

Figure 3:
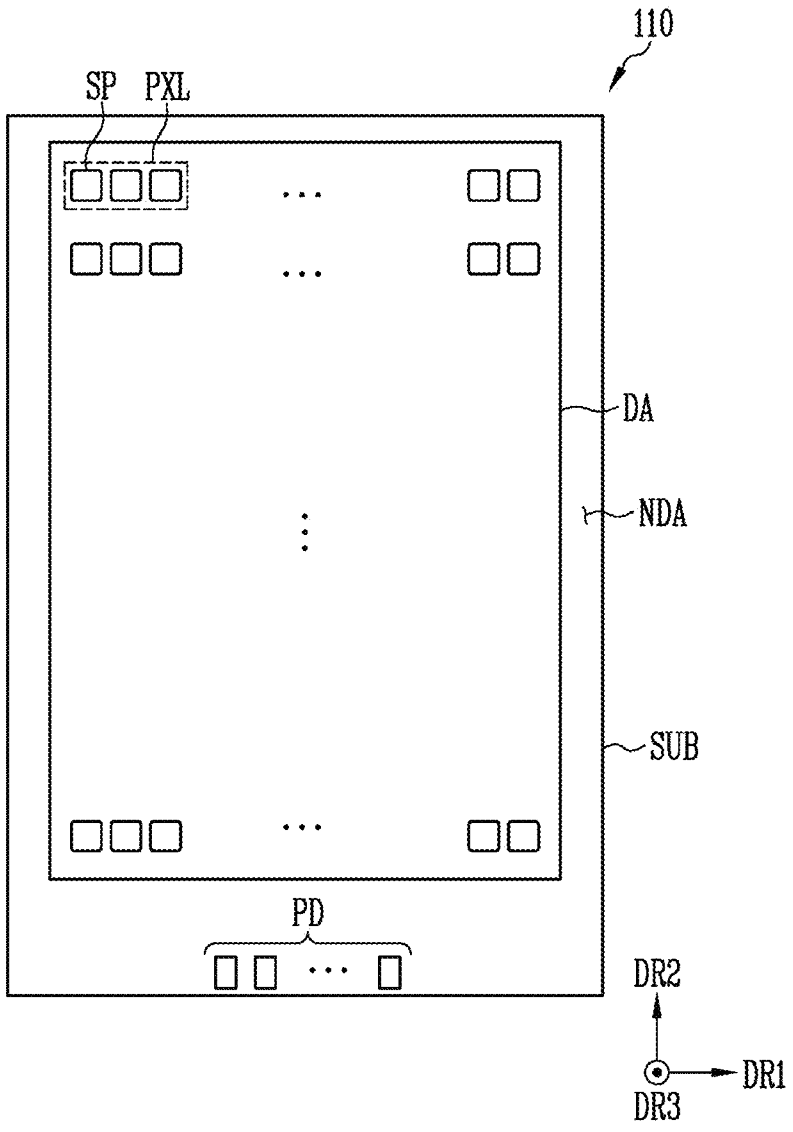
FIG. 3 is a plan view illustrating an embodiment of a display panel of FIG. 1.

FIG. 3 is a plan view illustrating an embodiment of a display panel of FIG. 1.

Referring to FIG. 3, the display panel 110 of FIG. 1 may include a display area DA and a non-display area NDA. The display panel 110 may display an image through the display area DA. The non-display area NDA may surround at least a portion of the display area DA.

The display panel 110 may include a substrate SUB, sub-pixels SP, and pads PD.

When the display panel 110 is used as a display screen for a head-mounted display (HMD) device, a virtual reality (VR) device, a mixed reality (MR) device, or an augmented reality (AR) device, the display panel 110 may be positioned close to a user's eyes. In such cases, sub-pixels SP with relatively high density may be deployed. To increase the density of the sub-pixels SP, the substrate SUB may be provided as a silicon substrate. The sub-pixels SP and/or the display panel 110 may be disposed on the substrate SUB. The display device 100 (see FIG. 1) including the display panel 110 disposed on the substrate SUB deployed as a silicon substrate may be referred to as an OLEDoS (OLED on Silicon) display device.

The sub-pixels SP may be disposed in the display area DA on the substrate SUB. The sub-pixels SP may be arranged in a matrix form along a first direction DR1 and a second direction DR2 intersecting the first direction DR1. However, embodiments are not limited thereto. For example, the sub-pixels SP may be arranged in a zigzag shape along the first direction DR1 and the second direction DR2. For example, the sub-pixels SP may be arranged with subpixels of varying sizes. The first direction DR1 may be a row direction, and the second direction DR2 may be a column direction.

Two or more sub-pixels among a plurality of sub-pixels SP may constitute one pixel PXL.

Components for controlling the sub-pixels SP may be disposed in the non-display area NDA of the substrate SUB. For example, wirings connected to the sub-pixels SP, such as the first to m-th gate lines GL1 to GLm and the first to n-th data lines DL1 to DLn of FIG. 1, may be at least partially disposed in the non-display area NDA.

At least one of the gate driver 120, the data driver 130, the voltage generator 140, the controller 150, and the temperature sensor 160 of FIG. 1 may be integrated in a non-display area NDA of the display panel 110. In some embodiments, the gate driver 120 of FIG. 1 may be mounted on the display panel 110 and disposed in the non-display area NDA. In at least one embodiment, the gate driver 120 may be implemented as an integrated circuit separate from the display panel 110. In some embodiments, the temperature sensor 160 may be disposed in the non-display area NDA and configured to detect the temperature of the display panel 110.

The pads PD may be disposed in the non-display area NDA on the substrate SUB. The pads PD may be electrically connected to the sub-pixels SP through wirings. For example, the pads PD may be connected to the sub-pixels SP through the first to n-th data lines DL1 to DLn.

The pads PD may interface the display panel 110 to other components of the display device 100 (see FIG. 1). In some embodiments, voltages and signals for operating the components included in the display panel 110 may be provided from the driver integrated circuit DIC of FIG. 1 through the pads PD. For example, the first to n-th data lines DL1 to DLn may be connected to the driver integrated circuit DIC through the pads PD.

For example, the first and second power source voltages VDD and VSS may be received from the driver integrated circuit DIC through the pads PD. Referring to FIG. 1, the voltage generator 140 may apply the first to fourth zone power source voltages VDD1 to VDD4 for each zone to the display panel 110 through the pads PD and the power source channels CH1 to CH4.

For example, when the gate driver 120 is mounted on the display panel 110, the gate control signal GCS may be transmitted from the driver integrated circuit DIC to the gate driver 120 through the pads PD.

In some embodiments, a circuit board may be electrically connected to the pads PD by solder or a conductive adhesive such as an anisotropic conductive film. In the case of the circuit board being electrically connected to the pads PD by conductive adhesive, the circuit board may be a flexible circuit board (FPCB) or a flexible film having a flexible material. The driver integrated circuit DIC may be mounted on the circuit board and electrically connected to the pads PD.

In some embodiments, the display area DA may have various shapes. The display area DA may have a closed loop shape including straight and/or curved sides. For example, the display area DA may have a shape such as a polygon, a circle, a semicircle, or an ellipse.

In some embodiments, the display panel 110 may have a flat display surface. In at least one embodiment, the display panel 110 may have an at least partially rounded display surface. In some embodiments, the display panel 110 may be bent, folded, or rolled. In these cases, the display panel 110 and/or the substrate SUB may include a material having flexible properties.

Figure 4:
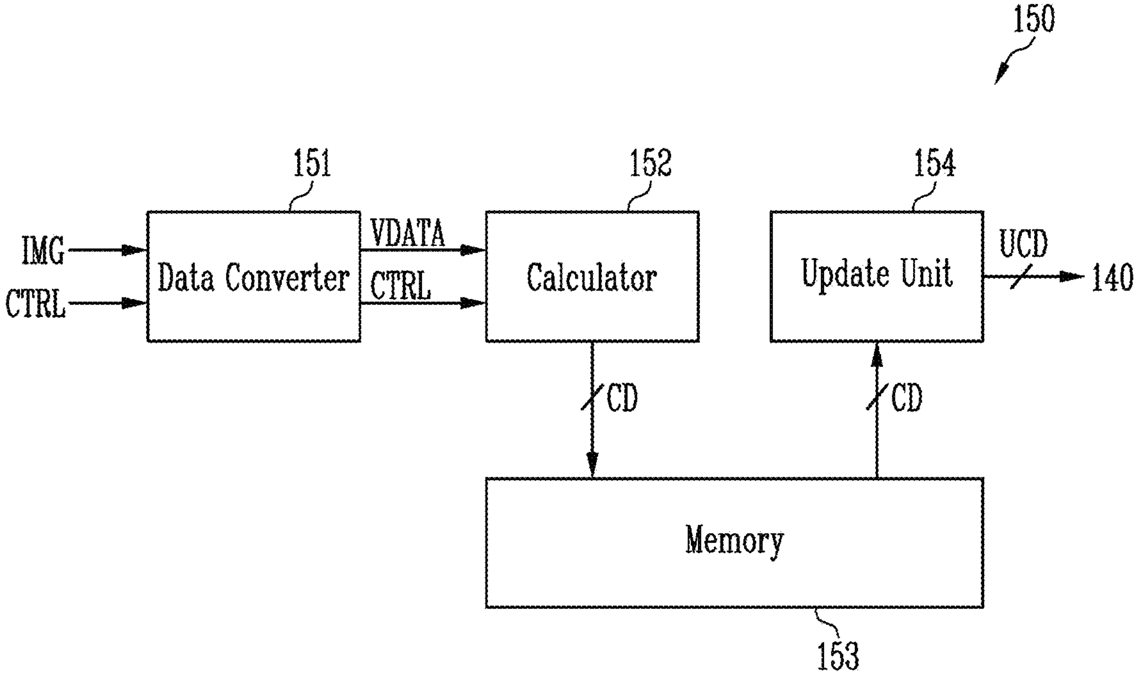
FIG. 4 is a block diagram illustrating the configuration of a controller of FIG. 1 according to embodiments of the present invention.
Figure 5:
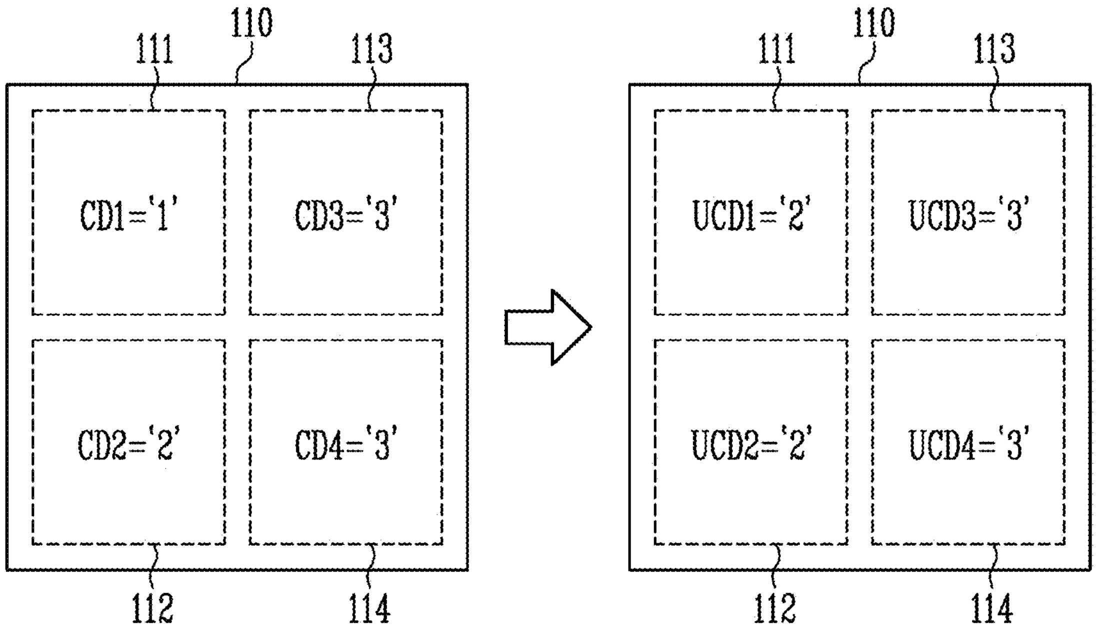
FIG. 5 is a conceptual diagram illustrating a code value and an updated code value according to embodiments of the present invention.

FIG. 4 is a block diagram illustrating a controller of FIG. 1 according to embodiments of the present invention. FIG. 5 is a conceptual diagram illustrating a code value and an updated code value according to embodiments of the present invention.

Referring to FIG. 1 and FIG. 4, the controller 150 may include a data converter 151, a calculator 152, a memory 153, and an update unit 154. However, the configuration of the controller 150 is not limited to that shown in FIG. 4. The controller 150 may include various components according to embodiments.

Referring to FIG. 4 and FIG. 5, a code value CD output by the calculator 152 and an updated code value UCD output by the update unit 154 are shown.

The data converter 151 may convert an input grayscale value included in the input image data IMG received from the outside into a voltage value VDATA using a gamma lookup table. That is, the data converter 151 may convert the input image data IMG in a grayscale domain into the voltage value VDATA in a voltage domain.

Here, the gamma lookup table may include the voltage value VDATA corresponding to the input grayscale value. In some embodiments, the gamma lookup table may be provided to the data converter 151 from a memory of the display device.

The data converter 151 may output the control signal CTRL received from the outside and the voltage value VDATA to the calculator 152.

The calculator 152 may determine which zone the voltage value VDATA is output to using the control signal CTRL and the voltage value VDATA, and calculate the code value CD corresponding to the voltage level of the first power source voltage VDD to be applied to the zone.

For example, for sequentially input voltage values VDATA, the calculator 152 may determine which zone the voltage value VDATA is output to, and determine a maximum value among the voltage values VDATA belonging to each zone of the first to fourth zones 111 to 114. The process of determining the maximum value in the calculator 152 may be performed on a frame-by-frame basis.

For each zone of the first to fourth zones 111 to 114, the calculator 152 may calculate the voltage level of the first power source voltage VDD based on the maximum value. For example, for each zone of the first to fourth zones 111 to 114, the calculator 152 may calculate the voltage level of the first power source voltage VDD proportional to the maximum value. For example, the lower the maximum value, more the calculator 152 may reduce the voltage level of the first power source voltage VDD applied to the corresponding zone, and the higher the maximum value, the more the calculator 152 may increase the voltage level of the first power source voltage VDD applied to the corresponding zone.

Here, the first power source voltage VDD may have a plurality of voltage levels distinguished from each other by a constant potential difference. In some embodiments, the first power source voltage VDD may have four voltage levels. For example, a first voltage level of the first power source voltage VDD may be '2 V', a second voltage level may be '3 V', a third voltage level may be '4 V', and a fourth voltage level may be '5 V'.

The calculator 152 may generate the code value CD corresponding to each of the voltage levels of the first power source voltage VDD. The code value CD may determine the voltage level of the first power source voltage VDD. For example, when a code value CD1 corresponding to the first zone 111 is '1', the first power source voltage VDD having the first voltage level may be applied to the first zone 111. When a code value CD2 corresponding to the second zone 112 is '2', the first power source voltage VDD having the second voltage level may be applied to the second zone 112.

That is, the calculator 152 may calculate first to fourth code values CD1 to CD4 corresponding to the voltage levels of the first power source voltage VDD to be applied to each zone of the first to fourth zones 111 to 114.

The calculator 152 may calculate the first to fourth code values CD1 to CD4 after a gate signal is applied to gate lines connected to all sub-pixels included in the first to fourth zones 111 to 114.

For example, when the first zone 111 includes first to fourth sub-pixel rows, the calculator 152 may calculate the first code value CD1 after a gate signal is applied to gate lines connected to the sub-pixels included in the fourth sub-pixel row.

The calculator 152 may store the calculated code values CD in the memory 153.

The update unit 154 may calculate updated code values UCD based on the code values CD stored in the memory 153. When the code values CD of the zones included in the display panel 110 are stored in the memory 153, the update unit 154 may calculate the updated code values UCD. In some embodiments, when the code values CD are stored in the memory 153 during one frame, the update unit 154 may calculate the updated code values UCD after the frame ends.

The update unit 154 may compare a code value of a target zone with adjacent code values to calculate an updated code value of the target zone. The target zone may be a target of an operation that generates the updated code value.

Figure 10:
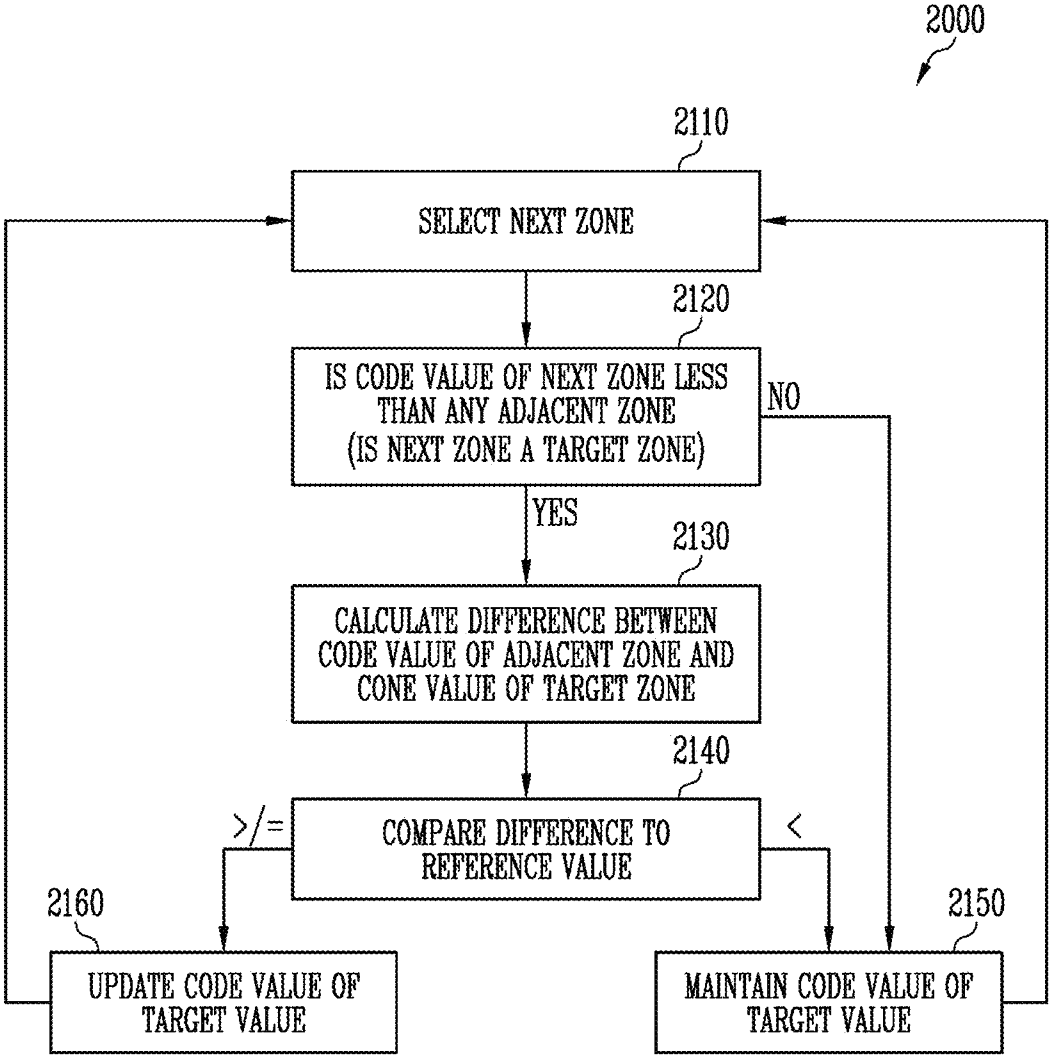
FIG. 10 is a flow diagram of a method of updating code values for zones according to embodiments of the present invention.

The order in which target zones are determined among the plurality of zones may be similar to the order in which the gate signals are applied. For example, referring to FIG. 5, target zones may be determined in the order of the first zone 111, the third zone 113, the second zone 112, and the fourth zone 114. However, the present invention is not limited thereto, and the order in which target zones are determined may be determined in various ways. Referring to FIG. 10, in a method 2000 of the controller 150 for updating code values for zones according to embodiments of the present invention, may include selecting a next zone at block 2110. At block 2120, zones that have code values greater than all of the adjacent zones may not be selected as a target zone. For example, in considering next zones among the first to fourth zone 111 to 114, the third zone 113 and the fourth zone 114 may be omitted from consideration as a target zone at block 2120.

An adjacent code value may be the code value of a zone adjacent to the target zone. The adjacent zone may have at least one side in contact with the target zone. The adjacent zone may be adjacent to the target zone in one of the directions of up, down, left, and right. For example, when the first zone 111 is the target zone, the adjacent zones may be the second zone 112 and the third zone 113. However, the present invention is not limited thereto, and other adjacencies may be used, for example, a 4-neighbor adjacency or an 8-neighbor adjacency may be used.

The update unit 154 may calculate a difference between the code value of the target zone and at least one of the adjacent code values when the code value of the target zone is smaller than at least one of the adjacent code values at block 2130. The update unit 154 may maintain the code value of the target zone when the code value of the target zone is greater than or equal to the adjacent code values (see block 2120). That is, the updated code value UCD of the target zone may be equal to the code value CD.

Referring to FIG. 5, when the first zone 111 is the target zone, the code value '1' of the target zone may be smaller than the code value '2' of the second zone 112 and the code value '3' of the third zone 113, and the update unit 154 may calculate a difference between the code value '1' of the target zone and at least one of the adjacent code values at block 2130.

When the third zone 113 is the target zone, the code value '3' of the target zone may be greater than or equal to the code value '1' of the first zone 111 and the code value '3' of the fourth zone 114, and the update unit 154 may maintain the code value of the target zone. For example, the difference between the third zone 113 and the first zone 111 in this example may not be determined, since the code value of the third zone 113 is greater than the code value of the first zone 111. Further, the selection of the third zone 113 as a target zone may be avoided at block 2120. However, the present invention is not limited thereto, and in some embodiments, each zone may be considered a target zone, and each adjacent zone of the target zone may be considered in the determination of the differences.

The update unit 154 may compare a maximum difference value, which may be the largest value among calculated difference values, with a reference value at block 2140. When the maximum difference value is greater than or equal to the reference value, the update unit 154 may update the code value of the target zone at block 2160 so that the maximum difference value is less than the reference value. The reference value may be '2'. When the maximum difference value is less than the reference value, the update unit 154 may maintain the code value of the target zone at block 2150. The reference value may be '2'.

In at least one embodiment, the update unit 154 may compare the calculated difference values with the reference value. When at least one of the difference values is greater than or equal to the reference value, the update unit 154 may update the code value of the target zone so that all of the difference values are less than the reference value.

Referring to FIG. 5, when the target zone is the first zone 111, the update unit 154 may calculate a first difference value between a first code value CD1 and a second code value CD2, and calculate a second difference value between the first code value CD1 and a third code value CD3.

The first difference value between the first code value CD1 and the second code value CD2 may be '1', and the second difference value between the first code value CD1 and the third code value CD3 may be '2'. The maximum difference value among the first and second difference values may be '2', and since the maximum difference value is greater than or equal to the example reference value of '2', the update unit 154 may update the updated code value UCD1 of the first zone 111 to '2' so that the maximum difference value is less than the reference value. In this case, the updated code value UCD1 may be greater than the code value CD1 before being updated.

Referring to FIG. 5, when the target zone is the second zone 112, the update unit 154 may calculate a first difference value between the second code value CD2 and the first code value CD1, and calculate a second difference value between the second code value CD2 and the fourth code value CD4.

The first difference value between the second code value CD2 and the first code value CD1 may be '1', and the second difference value between the second code value CD2 and the fourth code value CD4 may be '1'. The maximum difference value among the first and second difference values may be '1', and since the maximum difference value is less than the example reference value of '2', the update unit 154 may maintain the updated code value UCD2 of the second zone 112 as the code value CD2 of the second zone 112. In this case, the updated code value UCD2 may be the same as the code value CD2.

That is, the update unit 154 may selectively update the code value so that a difference in code values between adjacent zones becomes less than the reference value. Accordingly, boundaries caused by a difference in voltage levels applied to adjacent zones may be visually reduced, and image quality of the display panel 110 can be improved.

The update unit 154 may output the updated code values UCD to the voltage generator 140. The updated code values UCD may be included in the voltage control signal VCS of FIG. 1.

In some embodiments, the update unit 154 may output the updated code values UCD to the voltage generator 140 before the start of the next frame following the frame in which the code values CD are calculated. For example, the start of the next frame may be identified by the output of the image data DATA corresponding to the next frame by the controller 150.

In at least one embodiment, the update unit 154 may sequentially output the updated code values UCD to the voltage generator 140. In at least one embodiment, the update unit 154 may sequentially output the updated code values UCD to the voltage generator 140 before a gate signal is applied to gate lines connected to the sub-pixels included in the first to fourth zones 111 to 114.

For example, when the first zone 111 and the third zone 113 include the first to fourth sub-pixel rows, the update unit 154 may output a first updated code value UCD1 and a third updated code value UCD3 to the voltage generator 140 before a gate signal is applied to gate lines connected to the sub-pixels included in the first sub-pixel row.

When the second zone 112 and the fourth zone 114 include fifth to eighth sub-pixel rows, the update unit 154 may output a second updated code value UCD2 and a fourth updated code value UCD4 to the voltage generator 140 before a gate signal is applied to gate lines connected to the sub-pixels included in the fifth sub-pixel row.

Figure 6:
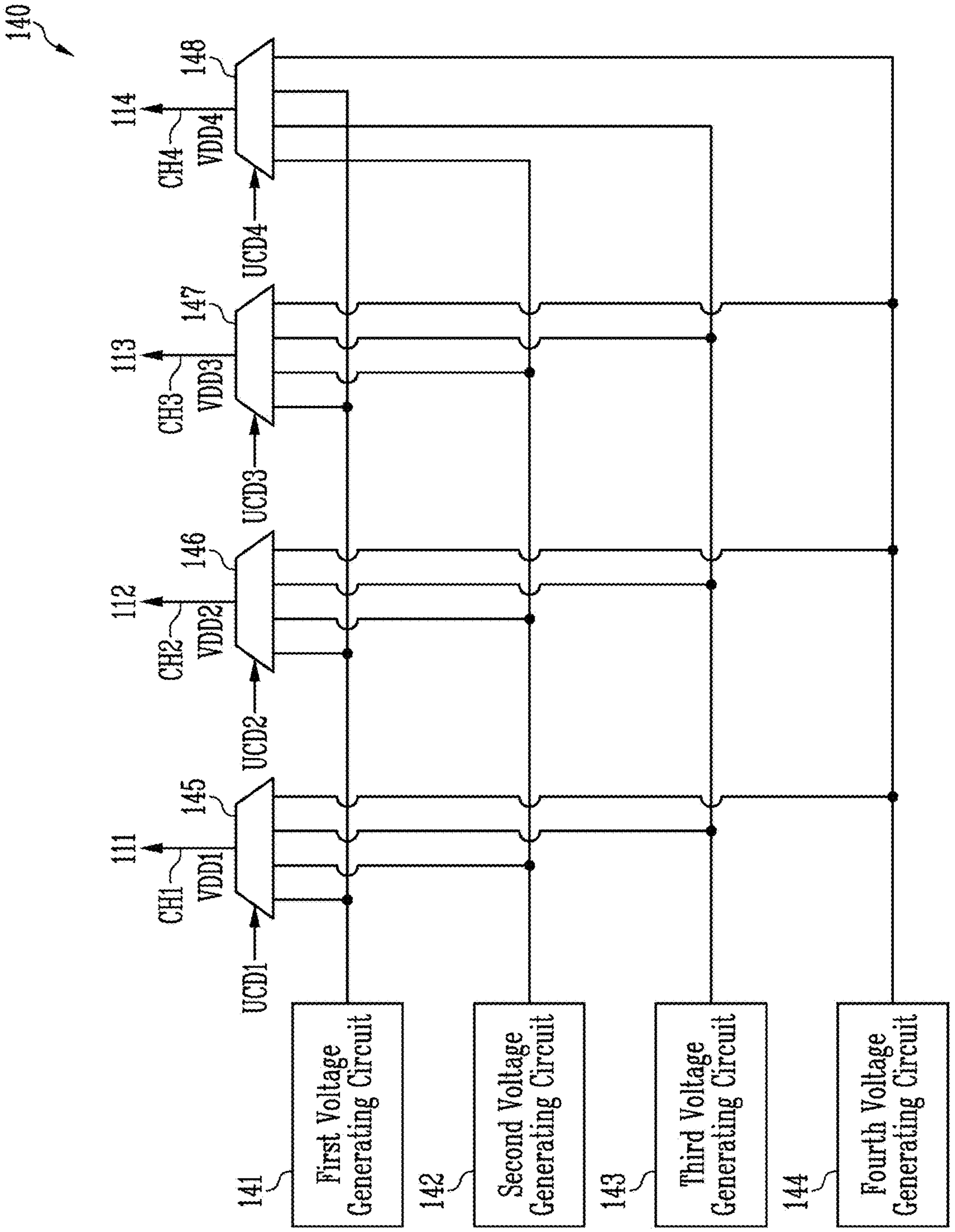
FIG. 6 is a block diagram illustrating the configuration of a voltage generator of FIG. 1 according to embodiments of the present invention.

FIG. 6 is a block diagram illustrating the configuration of a voltage generator of FIG. 1 according to embodiments of the present invention.

Referring to FIG. 6, the voltage generator 140 may include a first voltage generating circuit 141, a second voltage generating circuit 142, a third voltage generating circuit 143, and a fourth voltage generating circuit 144, and may include a first multiplexer 145, a second multiplexer 146, a third multiplexer 147, and a fourth multiplexer 148.

The first voltage generating circuit 141 may generate a first power source voltage having a first voltage level, the second voltage generating circuit 142 may generate a first power source voltage having a second voltage level, the third voltage generating circuit 143 may generate a first power source voltage having a third voltage level, and the fourth voltage generating circuit 144 may generate a first power source voltage having a fourth voltage level.

Each of the first to fourth voltage generating circuits 141 to 144 may output the generated first power source voltage to the first to fourth multiplexers 145 to 148.

The first multiplexer 145 may output one of the first power source voltage having the first voltage level, the first power source voltage having the second voltage level, the first power source voltage having the third voltage level, or the first power source voltage having the fourth voltage level as a first zone power source voltage VDD1 corresponding to the first zone 111 using the first updated code value UCD1. For example, the first updated value UCD1 may be a selection signal used by the first multiplexer 145 for selecting among the outputs of the first to fourth voltage generating circuits 141 to 144.

For example, when the first updated code value UCD1 is '1', the first power source voltage having the first voltage level may be output as the first zone power source voltage VDD1 corresponding to the first zone 111. When the first updated code value UCD1 is '2', the first power source voltage having the second voltage level may be output as the first zone power source voltage VDD1 corresponding to the first zone 111. When the first updated code value UCD1 is '3', the first power source voltage having the third voltage level may be output as the first zone power source voltage VDD1 corresponding to the first zone 111. When the first updated code value UCD1 is '4', the first power source voltage having the fourth voltage level may be output as the first zone power source voltage VDD1 corresponding to the first zone 111.

The first multiplexer 145 may output the first zone power source voltage VDD1 to the first zone 111 through a first power source channel CH1. For example, the first multiplexer 145 may output the first zone power source voltage VDD1 to the first zone 111 through a first power source channel CH1 using the first updated value UCD1 as a selection signal.

Similarly, the second multiplexer 146 may output one of the first power source voltage having the first voltage level, the first power source voltage having the second voltage level, the first power source voltage having the third voltage level, or the first power source voltage having the fourth voltage level as a first zone power source voltage VDD1 corresponding to the second zone 112 based on the second updated code value UCD2. For example, the second updated code value UCD2 may be a selection signal used by the second multiplexer 146 for selecting among the outputs of the first to fourth voltage generating circuits 141 to 144.

The third multiplexer 147 may output one of the first power source voltage having the first voltage level, the first power source voltage having the second voltage level, the first power source voltage having the third voltage level, or the first power source voltage having the fourth voltage level as a first zone power source voltage VDD1 corresponding to the third zone 113 based on the third updated code value UCD3. For example, the third updated code value UCD3 may be a selection signal used by the third multiplexer 147 for selecting among the outputs of the first to fourth voltage generating circuits 141 to 144.

The fourth multiplexer 148 may output one of the first power source voltage having the first voltage level, the first power source voltage having the second voltage level, the first power source voltage having the third voltage level, or the first power source voltage having the fourth voltage level as a first zone power source voltage VDD1 corresponding to the fourth zone 114 based on the fourth updated code value UCD4. For example, the fourth updated code value UCD4 may be a selection signal used by the fourth multiplexer 148 for selecting among the outputs of the first to fourth voltage generating circuits 141 to 144.

While a method for updating code values of zones has been described in the context of determining a maximum difference value when the code value of the target zone is less than at least one adjacent zone (see for example, FIG. 10), embodiments of the present disclosure are not limited thereto. For example, the determinations may be made in the context of determining a maximum difference value when the code value of the target zone is greater than the code value of at least one adjacent zone. For example, a zone (the next zone) may be selected as a target zone when a code value of at least one adjacent zone is less than the code value of the next zone, and the updated code value of the target zone may be less than the code value before being updated.

FIG. 6 shows four voltage generating circuits, but the present invention is not limited thereto. The voltage generator 140 may include a number of voltage generating circuits equal to the number of voltage levels of the first power source voltage.

In addition, FIG. 6 shows four multiplexers, but the present invention is not limited thereto. A number of multiplexers equal to the number of zones included in the display panel 110 of FIG. 1 may be included.

Figure 7:
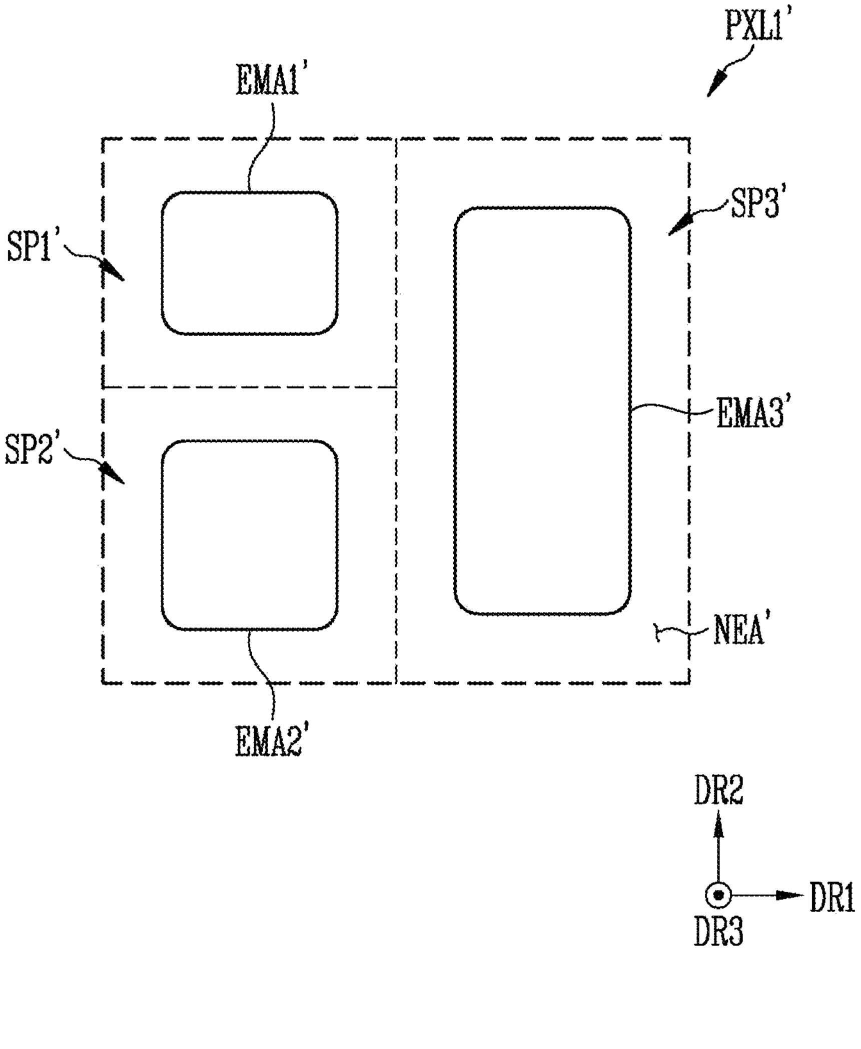
FIG. 7 is a plan view illustrating an embodiment of one of pixels of FIG. 1.

FIG. 7 is a plan view illustrating an embodiment of one of pixels of FIG. 1.

Referring to FIG. 7, a first pixel PXL1' may include a first sub-pixel SP1', a second sub-pixel SP2', and a third sub-pixel SP3'.

The first sub-pixel SP1' may include a first emission area EMA1' and a non-emission area NEA' around the first emission area EMA1'. The second sub-pixel SP2' may include a second emission area EMA2' and the non-emission area NEA' around the second emission area EMA2'. The third sub-pixel SP3' may include a third emission area EMA3' and the non-emission area NEA' around the third emission area EMA3'.

The first sub-pixel SP1' and the second sub-pixel SP2' may be arranged in the second direction DR2. The third sub-pixel SP3' may be arranged in the first direction DR1 with respect to each of the first and second sub-pixels SP1' and SP2'.

The second sub-pixel SP2' may have a larger area than the first sub-pixel SP1', and the third sub-pixel SP3' may have a larger area than the second sub-pixel SP2'. Accordingly, the second emission area EMA2' may have a larger area than the first emission area EMA1', and the third emission area EMA3' may have a larger area than the second emission area EMA2'. However, embodiments are not limited thereto. For example, the first and second sub-pixels SP1' and SP2' may have substantially the same area, and the third sub-pixel SP3' may have a larger area than the first and second sub-pixels SP1' and SP2'. In this way, the areas of the first to third sub-pixels SP1' to SP3' may be varied in various ways depending on embodiments.

Figure 8:
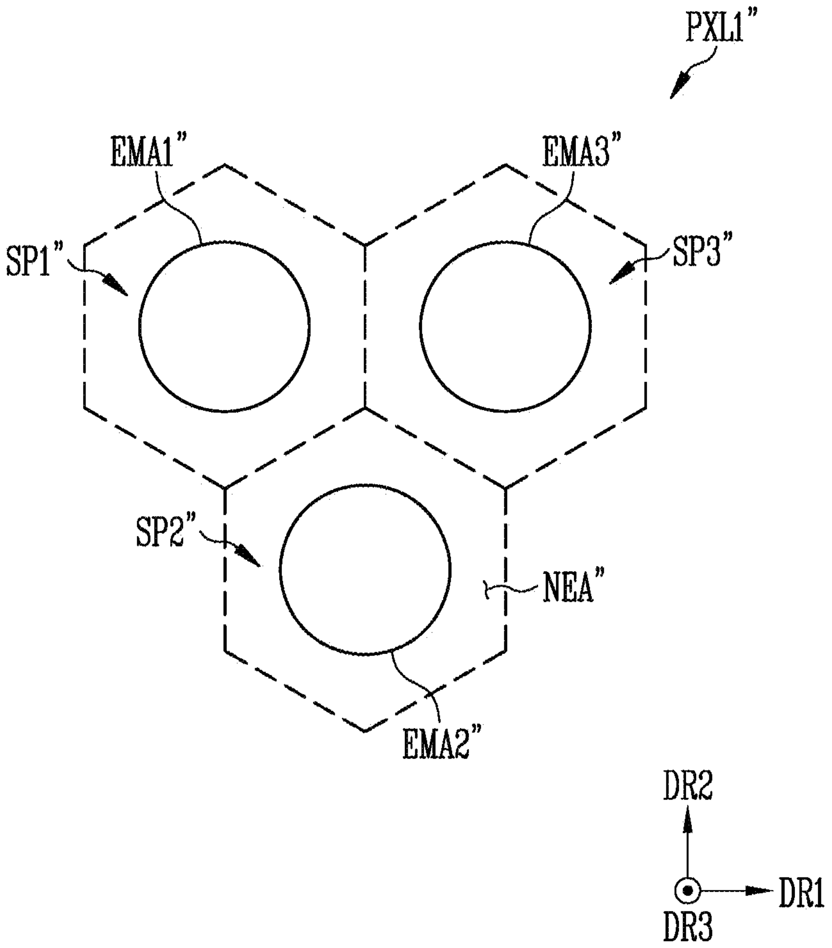
FIG. 8 is a plan view illustrating an embodiment of one of the pixels of FIG. 1.

FIG. 8 is a plan view illustrating an embodiment of one of the pixels of FIG. 1.

Referring to FIG. 8, a first sub-pixel SP1" may include a first emission area EMA1" and a non-emission area NEA" at least partially surrounding the first emission area EMA1". A second sub-pixel SP2" may include a second emission area EMA2" and the non-emission area NEA" at least partially surrounding the second emission area EMA2". A third sub-pixel SP3" may include a third emission area EMA3" and the non-emission area NEA" at least partially surrounding the third emission area EMA3".

The first to third sub-pixels SP1" to SP3" may have a polygonal shape when viewed in the third direction DR3. For example, the shapes of the first to third sub-pixels SP1" to SP3" may be hexagonal, as shown in FIG. 8.

The first to third emission areas EMA1" to EMA3" may have a circular shape when viewed in the third direction DR3. However, embodiments are not limited thereto. For example, the first to third emission areas EMA1" to EMA3" may have a polygonal shape.

The first and third sub-pixels SP1" and SP3" may be arranged in the first direction DR1. The second sub-pixel SP2" may be arranged in a direction inclined at an acute angle (or diagonal direction) with respect to the first sub-pixel SP1" based on the second direction DR2.

The arrangements of the sub-pixels shown in FIG. 1, FIG. 7, and FIG. 8 are examples, and embodiments are not limited thereto. Each pixel may include two or more sub-pixels, the sub-pixels may be arranged in various ways, each of the sub-pixels may have various shapes, and each of the emission areas of the sub-pixels may also have various shapes.

Figure 9:
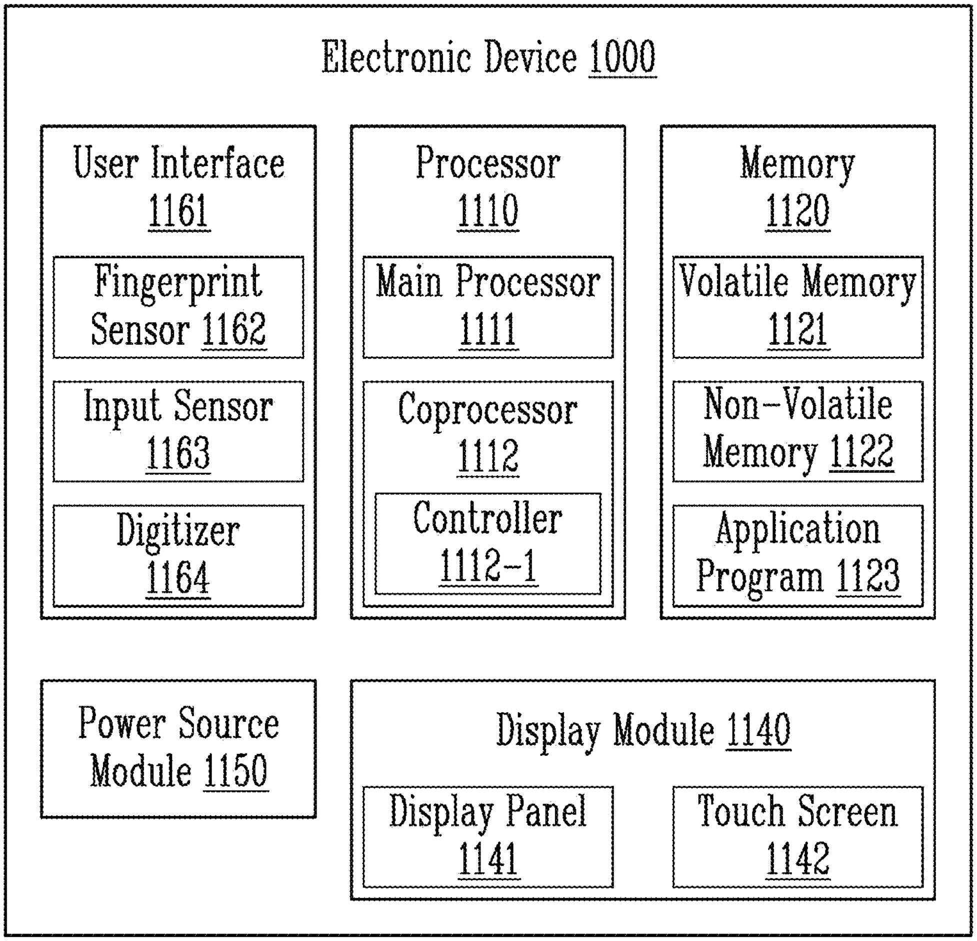
FIG. 9 is a block diagram illustrating an electronic device according to embodiments of the present invention.

FIG. 9 is a block diagram illustrating an electronic device according to embodiments of the present invention.

Referring to FIG. 9, the electronic device 1000 according to one embodiment of the present invention may output various information (e.g., images, text, music, etc.) through a display module 1140, which, for example, may correspond to the display device 100 shown in FIG. 1. When a processor 1110 executes an application stored in a memory 1120, the display module 1140 may provide application information to a user through a display panel 1141, such as the display panel 110 of FIG. 1.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include a software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device 100 shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display unit shown in FIG. 1.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

According to the display device according to some embodiments of the present invention, boundaries caused by a difference in voltage levels between adjacent zones are not visually recognized, which can improve image quality.

However, effects of the present invention are not limited to the above-described effects, and may be variously extended without departing from the spirit and scope of the present invention.

The technical protection scope of the present invention is not limited to the detailed description described in the specification, but should be determined by the append claims. In addition, all changes or modifications derived from the meaning and scope of the claims and their equivalents should be construed as being included in the scope of the present invention.

What is claimed is:

1. A display device comprising:

a display panel including a plurality of sub-pixels and divided into a plurality of zones;

a voltage generator applying a first power source voltage having a voltage level corresponding to each of the plurality of zones through a plurality of power source channels; and a controller outputting, to the voltage generator, a code value that determines the voltage level of the first power source voltage applied by the voltage generator, wherein the controller includes an update unit that updates a code value of a target zone based on a difference between an adjacent code value and the code value of the target zone, and wherein the adjacent code value is a code value of a zone adjacent to the target zone.

2. The display device of claim 1, wherein a difference between an updated code value of the target zone and the adjacent code value is less than a reference value.

3. The display device of claim 2, wherein each of the plurality of sub-pixels includes a light emitting element connected between a first power source voltage node to which the first power source voltage is applied and a second power source voltage node to which a second power source voltage is applied, and wherein the light emitting element emits light in response to current flowing to the first power source voltage node and the second power source voltage node.

4. The display device of claim 3, further comprising:

a gate driver applying a gate signal to the sub-pixels through gate lines, wherein the controller further includes a calculator calculating the code values of the plurality of zones, and wherein the calculator calculates a code value corresponding to a first zone when the gate signal is applied to all sub-pixels included in the first zone among the plurality of zones.

5. The display device of claim 1, further comprising a plurality of adjacent zones, including the zone adjacent to the target zone, wherein each adjacent zone of the plurality of adjacent zones has at least one side proximate to the target zone, and wherein the difference between the adjacent code value and the code value of the target zone is greater than a different between each remaining adjacent zone of the plurality of adjacent zones and the code value of the target zone.

6. The display device of claim 5, wherein the update unit:

calculates a difference between the code value of the target zone and the adjacent code values when the code value of the target zone is less than at least one of the adjacent code values;

compares a maximum difference value, which is a largest value among the difference values calculated by the controller, with a reference value, and updates the code value of the target zone so that the maximum difference value is less than the reference value when the maximum difference value is greater than or equal to the reference value.

7. The display device of claim 1, wherein the code value of the target zone updated by the controller is greater than the code value of the target zone before being updated.

8. The display device of claim 1, further comprising:

a memory storing a code value corresponding to each of the plurality of zones, wherein the controller calculates the code value corresponding to each of the plurality of zones during a first frame, and outputs calculated code values to the memory, and wherein the update unit updates the code value of the target zone based on code values stored in the memory.

9. The display device of claim 1, wherein the update unit outputs the code value updated for the target zone to the voltage generator before a second frame, which is a next frame following a first frame, starts.

10. The display device of claim 9, wherein the update unit sequentially outputs updated code values during a second frame, which is the next frame following the first frame.

11. The display device of claim 10, further comprising:

a gate driver applying a gate signal to the sub-pixels through a plurality of gate lines, wherein the update unit outputs the code value updated for the target zone to a first zone before the gate signal is applied to the sub-pixels included in the first zone among the plurality of zones during the second frame.

12. The display device of claim 1, wherein the voltage generator includes:

a first multiplexer connected to a first zone among the plurality of zones through a first power source channel;

a first voltage generating circuit outputting a first power source voltage having a first voltage level to the first multiplexer;

a second voltage generating circuit outputting a first power source voltage having a second voltage level to the first multiplexer;

a third voltage generating circuit outputting a first power source voltage having a third voltage level to the first multiplexer; and a fourth voltage generating circuit outputting a first power source voltage having a fourth voltage level to the first multiplexer, wherein the first multiplexer outputs the first power source voltage having one of the first to fourth voltage levels to the first zone based on a code value received from the update unit.

13. An electronic device comprising:

a processor generating input image data and a control signal; and a display device displaying an image based on the input image data and the control signal, wherein the display device includes:

a display panel including a plurality of sub-pixels and divided into a plurality of zones;

a voltage generator applying a first power source voltage having a voltage level corresponding to each of the plurality of zones through a plurality of power source channels; and a controller controlling the display panel and the voltage generator based on the input image data and the control signal, and outputting, to the voltage generator, a code value that determines the voltage level of the first power source voltage applied by the voltage generator, wherein the controller includes an update unit that updates a code value of a target zone based on a difference between an adjacent code value and the code value of the target zone, and wherein the adjacent code value is a code value of a zone proximate to the target zone.

14. The electronic device of claim 13, wherein a difference between an updated code value of the target zone and the adjacent code value is less than a reference value.

15. The electronic device of claim 14, wherein each of the plurality of sub-pixels includes a light emitting element connected between a first power source voltage node to which the first power source voltage is applied and a second power source voltage node to which a second power source voltage is applied, and wherein the light emitting element emits light in response to current flowing to the first power source voltage node and the second power source voltage node.

16. The electronic device of claim 14, wherein the update unit:

calculates a difference between the code value of the target zone and the adjacent code values when the code value of the target zone is less than at least one of the adjacent code values, compares a maximum difference value, which is a largest value among the difference values calculated by the controller, with the reference value, and updates the code value of the target zone so that the maximum difference value is less than the reference value when the maximum difference value is greater than or equal to the reference value.

17. A display device comprising:

a display panel including a plurality of sub-pixels and divided into a plurality of zones including a target zone and a plurality of adjacent zones;

a voltage generator applying a first power source voltage having a voltage level corresponding to each of the plurality of zones through a plurality of power source channels; and a controller includes a calculator calculating a plurality of code values of the plurality of zones, a memory storing the plurality of code values, and an update unit that updates a code value of a first target zone based on a difference between a first adjacent code value and the code value of the first target zone and a reference value, wherein the first adjacent code value is a code value of a zone proximate to the first target zone among the plurality of zones, wherein the controller outputs, to the voltage generator, the plurality of code values, including the code value updated for the first target zone, that determine the voltage level of the first power source voltage applied by the voltage generator, and wherein the code value updated for the first target zone reduces a difference in luminance between pixels of the first target zone and pixels of a first adjacent zone corresponding to the first adjacent code value.

18. The display device of claim 17, wherein the update unit:

calculates a difference between a code value of a second target zone and a second adjacent code value of the second target zone when the code value of the second target zone is less than at least one of the adjacent code values;

compares the difference between the code value of the second target zone and the second adjacent code value of the second target zone with the reference value; and maintains the code value of the second target zone when the difference between the code value of the second target zone and the second adjacent code value of the second target zone is less than the reference value.

19. The display device of claim 17, further comprising:

a gate driver applying a gate signal to the sub-pixels through a plurality of gate lines, wherein the update unit outputs the code value updated for the target zone to a first zone before the gate signal is applied to the sub-pixels included in the first zone among the plurality of zones during a next frame.

20. The display device of claim 17, wherein the voltage generator includes:

a first multiplexer connected to a first zone among the plurality of zones through a first power source channel;

a first voltage generating circuit outputting a first power source voltage having a first voltage level to the first multiplexer;

a second voltage generating circuit outputting a first power source voltage having a second voltage level to the first multiplexer;

a third voltage generating circuit outputting a first power source voltage having a third voltage level to the first multiplexer; and a fourth voltage generating circuit outputting a first power source voltage having a fourth voltage level to the first multiplexer, wherein the first multiplexer outputs the first power source voltage having one of the first to fourth voltage levels to the first zone based on a code value received from the update unit.

* * * * *